United States Patent [19]

Iwamoto et al.

[11] Patent Number: 5,278,685
[45] Date of Patent: Jan. 11, 1994

[54] METHOD FOR DIVIDING SUBSTRATES OF LIQUID CRYSTAL DISPLAYS USING REPEATED MEASUREMENTS

[75] Inventors: Makoto Iwamoto, Yamatokoriyama; Shunsei Fukuchi, Nara; Hiroshi Takanashi, Kyoto; Kyouhei Isohata; Kenji Misono, both of Nara, all of Japan

[73] Assignee: Sharp Kabushiki Kaisha, Osaka, Japan

[21] Appl. No.: 967,263

[22] Filed: Oct. 27, 1992

[30] Foreign Application Priority Data

Oct. 29, 1991 [JP] Japan .................. 3-282705

[51] Int. Cl.⁵ ............... G02F 1/1333; G02F 1/1335
[52] U.S. Cl. .......................... 359/82; 359/62
[58] Field of Search ............ 359/62, 82, 83; 225/2, 225/96.5; 29/413, 592.1; 83/863, 876, 360, 364, 879, 881, 884; 356/355; 445/24; 437/226; 264/138, 157

[56] References Cited

U.S. PATENT DOCUMENTS

| | | | |
|---|---|---|---|
| 4,094,058 | 6/1978 | Yasutake et al. | 359/80 |
| 4,225,241 | 9/1980 | Dändliker et al. | 359/82 |
| 4,275,494 | 6/1981 | Kohyama et al. | 445/24 |
| 4,355,457 | 10/1982 | Barlett et al. | 29/413 |
| 4,544,583 | 10/1985 | Clausen et al. | 359/82 |
| 4,615,620 | 10/1986 | Noguchi et al. | 356/355 |
| 4,668,314 | 5/1987 | Endoh et al. | 156/64 |
| 4,829,868 | 5/1989 | Jenker | 83/881 |
| 4,927,485 | 5/1990 | Cheng et al. | 356/355 |
| 4,984,894 | 1/1991 | Kondo | 356/355 |
| 5,031,493 | 7/1991 | Dorr | 83/364 |

FOREIGN PATENT DOCUMENTS

| | | |
|---|---|---|
| 0048612 | 5/1981 | Japan . |
| 0138619 | 8/1982 | Japan . |
| 58-181022 | 10/1983 | Japan . |
| 59-37524 | 3/1984 | Japan . |
| 59-151131 | 8/1984 | Japan . |
| 60-35713 | 2/1985 | Japan . |
| 60-166925 | 8/1985 | Japan . |
| 1-292313 | 11/1989 | Japan . |

Primary Examiner—William L. Sikes
Assistant Examiner—Kenneth Parlor
Attorney, Agent, or Firm—David G. Conlin; George W. Neuner

[57] ABSTRACT

First and second transparent hard plastic substrates are placed one over the other to form therebetween a gap into which a liquid crystal is to be sealed in. The first and second substrates are mounted on the reference plane of a stage. The distance between the first substrate and the reference plane is measured in a non-contact manner at a plurality of measuring points on a predetermined dividing line. Based on the distances measured, a slit is formed on the first substrate by cutting the first substrate along the dividing line while leaving a portion of a predetermined thickness uncut. The first substrate is then broken along the slit. With this arrangement, it is possible to cut the substrates while leaving a portion of an appropriate thickness uncut irrespective of unevenness of the thickness or waviness of the first substrate. Moreover, since the surfaces of the cut sections of the substrates do no crack and since the portions of the substrates to be broken have a reduced thickness, the divided sections have smoother surfaces.

27 Claims, 10 Drawing Sheets

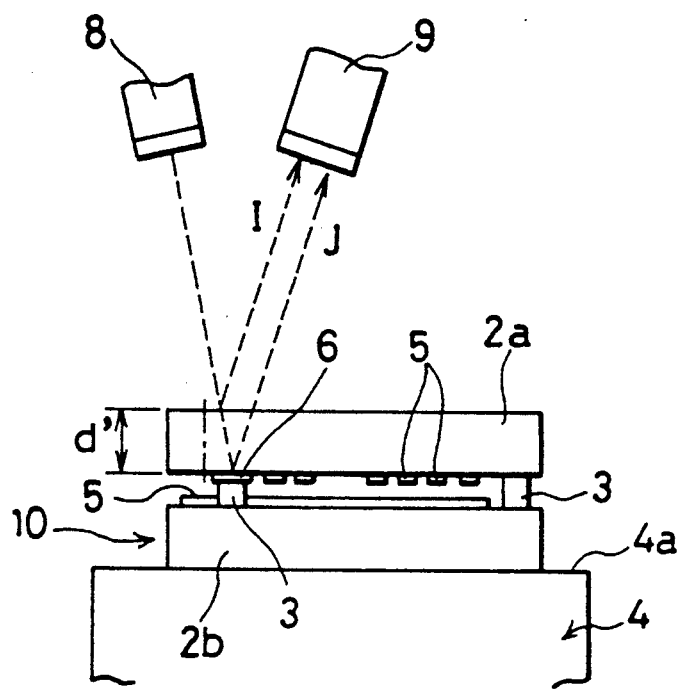
FIG.1
FIG.2
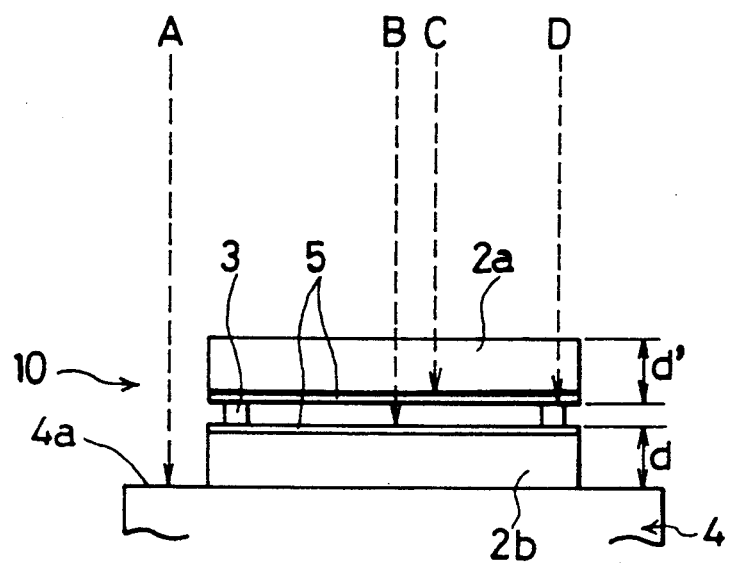

METHOD FOR DIVIDING SUBSTRATES OF LIQUID CRYSTAL DISPLAYS USING REPEATED MEASUREMENTS

FIELD OF THE INVENTION

The present invention relates to a method for dividing substrates constituting a LCD (Liquid Crystal Display) which is used as display, for example, in pocket-size personal computers, IC (Integrated Circuit) cards and word processors.

BACKGROUND OF THE INVENTION

In a conventional LCD, two pieces of transparent glass (for example, 300 mm (L) × 300 mm (W) × 0.5 mm to 1.1 mm (T)) are used as substrates for sandwiching a liquid crystal. An undercoat, ITO (indium Tin Oxide) electrodes as transparent electrodes, and an alignment film are formed respectively on the substrates, and the molecules of alignment film are then aligned.

Next, the two pieces of the glass substrates are placed to sandwich the ITO electrodes with a gap between them and bonded. The gap is formed for a liquid crystal layer. In the case of using such two glass substrates, the ITO electrodes can be formed on one of or both of the glass substrates.

Then, slits are made on the glass substrates so as to divide them into cells as liquid crystal display elements. Also, to expose the terminal sections of the ITO electrodes on one of the glass substrates, sections of the other glass substrate opposite the terminal sections are cut off.

With this manufacturing method, since it is possible to form numbers of cells in a pair of substrates having a predetermined gap therebetween at a time, cells having a uniform gap between the substrates are produced with precision. Besides, mass production permits a reduction in the manufacturing costs.

When dividing such glass substrates, firstly, scratches in the form of lines are made with a diamond cutter along predetermined dividing lines. Then, by applying a stress to the scratches with a breaking device, the glass substrates are broken along the dividing lines (breaking process).

In general, a glass substrate having a scratch in the shape of a line on its surface is easily broken when a stress is applied to the scratch. With this method, it is therefore possible to break the substrates along the scratches with precision.

In recent years, substrates produced from light-weight plastic are used for manufacturing a thinner and light-weight LCD. For the TN (Twisted Nematic)-type LCD, plastic films with a thickness of 0.1 mm to 0.3 mm, such as PES (Polyether Sulphone) or uniaxial oriented PET (Polyethylene Terephthalate) have been developed as substrates and mass-produced.

When cutting the substrates, a cutting device with a heat cutter is used or die cutting such as Thomson's die cutting method is adopted. In the case where such plastic films are used, however, it is impossible to cut only one of the two substrates if they are bonded. Therefore, to expose the terminal sections, cutting must be performed before bonding the two substrates.

Moreover, in recent years, it is known that plastic substrates produced from an acrylic resin or epoxy resin with the use of a mold having a polished surface are superior to those produced from the above-mentioned PES and uniaxial oriented PET in terms of the flatness of the substrate surface.

The acrylic resin and the epoxy resin are as stiff as they are used as lenses for glasses. If such resins are used to produce a substrate with a thickness of, for example, about 0.4 mm, the resulting substrate is brittle although it has some elasticity against a bending stress.

Therefore, unlike the glass substrates, even if stress is applied to split such a substrate along the scratches formed on the dividing lines thereon, it may not be broken along the dividing lines, deteriorating preciseness of dimensions. Thus, there is a possibility to produce defective products. In addition, the surfaces of the split sections tend to crack when stress is applied, and cracks tend to develop if a little stress is put, resulting in defective products.

Accordingly, the method used for cutting glass substrates can not be used when cutting substrates produced from an acrylic resin or epoxy resin to break them into cells and to expose terminal sections. Similarly, the method used for cutting a plastic film with a thickness of 0.1 to 0.3 mm can not be adopted when cutting such substrates.

Then, a cutting method including the dicing process using a substantially disk-shaped blade is suggested for cutting substrates having improved surface flatness, produced from hard and brittle plastic, such as acrylic resin and epoxy resin.

With this cutting method, the substrates are first placed on a movable stage as a worktable. Then, slits of a predetermined depth are formed on the substrates by rotating the blade while moving the stage so that the blade cuts the substrates along dividing lines. At this time, the depth of slit is determined so that the substrates are not completely cut off. The reason for this is to prevent the blade from coming into contact with and damaging the stage when cutting the substrates into cells and to prevent the terminal pattern from getting damaged when cutting the substrate to expose the terminal sections.

Next, the substrates are removed from the stage, and the uncut portion of the substrates is broken by applying stress to the substrates in a direction toward which the substrates are bent along the dividing lines. It is desirable to make the thickness of the uncut portion as small as possible when cutting the substrates with the blade.

With this cutting method, it is possible to divide the substrates without causing cracks because the sections of the substrates cut by the blade do not crack.

In contrast, with the above-mentioned conventional cutting method, the cut sections do not have smooth surfaces due to the following reasons.

With the present techniques for manufacturing the substrates, it is impossible to manufacture a substrate with a consistently uniform thickness. In reality, there is unevenness in the range of about ±70 μm in the thickness of a substrate. Also, to prevent the blade from coming into contact with and damaging the stage, it is necessary to arrange the uncut portion to have a thickness which is greater than an appropriate value when cutting the substrates.

This arrangement causes an increase in the thickness of the portion to be split by bending. Moreover, since the thickness of the portion is not uniform, the substrates may not be split along the dividing lines, increasing the number of cracks on the split surfaces. Consequently, the number of defective products increases.

Besides, the frictional heat produced by the rotating blade and the substrate when cutting the substrate melts the surfaces of the cut sections and chips of the substrate caused by dicing. When the melted portions of the substrate become hard, a protruding burr is formed on each side of the openings of the slits along the dividing lines. When the liquid crystal display element is placed upside down so as to cut the other substrate which was located at the lower position before turning the liquid crystal display element, such burrs come into contact with the stage. This adversely affects the preciseness of the depth of slit made by the blade. Namely, the thickness of the portion to be uncut becomes uneven. It is therefore difficult to obtain smooth surfaces when the substrate is broken, increasing the number of defective products.

SUMMARY OF THE INVENTION

An objective of the present invention is to provide a method for cutting substrates constituting liquid crystal display elements with a dicing blade while controlling a portion of the substrates to be uncut to have an appropriate value.

Another objective of the present invention is to provide a method for cutting substrates constituting liquid crystal display elements while removing burrs produced in a dicing process without largely extending the processing time.

In order to achieve the above-mentioned objectives, a method for cutting substrates constituting liquid crystal display elements of the present invention is characterized in including the steps of: preparing two transparent substrate; forming transparent electrodes on at least one of the substrates; forming a panel including a liquid crystal therein by placing the two transparent substrates with predetermined gap between them; mounting the panel on the reference plane of a moving stage; optically measuring the distance between the bottom surface of the substrate and the reference plane in a non-contact manner; and cutting the panel along the sealing layer with a dicing device having a substantially disk-shaped blade while moving the stage by controlling a portion of the substrates to be uncut to have a predetermined thickness based on the measurement result.

The distance between the bottom surface of the substrate and the reference plane is measured, for example, by forming a dummy pattern with the use of transparent electrodes in advance on the surfaces of the substrates in contact with the sealing layer and measuring the distance at the dummy pattern.

Burrs produced around the opening of slits, which are made on the substrate when the substrate is cut with the blade, can be removed by burr removing means which follows the movement of the blade.

With this method, after optically measuring the distance between bottom surface of the substrate of the panel and the reference plane in a non-contact manner, the dicing device is controlled based on the measurement result such that a portion of a predetermined thickness of the substrate remains uncut. Consequently, even if the thickness of each of the substrate is uneven and if the substrates are wavy, it is possible to maintain a portion with an appropriate thickness uncut. The substrates are thus broken along the slits with precision. This arrangement restrains the sections cut by the blade from cracking and allows an improvement of the smoothness of the surfaces of broken sections, thereby achieving a high yield of liquid crystal display elements.

When measuring the thickness of the substrate by using reflected light of laser light, a dummy pattern is formed in a section of the substrate where the sealing layer is to be formed. Since the light transmittance of the sealing layer is not much considered, it has a low light transmittance, preventing light from reaching the layer thereunder. Therefore, a reduced amount of light is reflected by the layer under the sealing layer during measuring, preventing interference in the reflected light.

Consequently, the thickness of the substrate is accurately measured at the dummy pattern. It is therefore possible to have a portion with an appropriate thickness uncut, by controlling the dicing device based on the measurement result. This enables an improvement of the smoothness of the surfaces of the broken sections, resulting in a high yield of liquid crystal display elements.

Additionally, the burrs produced when cutting the substrate are removed by the burr removing means which follows the blade. Namely, since the burrs are removed in the process of cutting the substrate, there is no need to include an additional process.

If the burrs are removed, no burr comes into contact with the stage when the panel is placed upside down to cut the other substrate. It is thus possible to accurately cut the substrate while leaving a portion of an appropriate thickness uncut. Consequently, when the substrates are broken, the broken sections have smoother surfaces, resulting in a high yield of liquid crystal display elements.

For a fuller understanding of the nature and advantages of the invention, reference should be made to the ensuing detailed description taken in conjunction with the accompanying drawings.

BRIEF DESCRIPTION OF THE DRAWINGS

FIG. 1 is an explanatory view illustrating a method of measuring the thickness of each substrate constituting a panel according to one embodiment of the present invention.

FIG. 2 is an explanatory view illustrating an alternative method of measuring the thickness of each of the substrates.

DESCRIPTION OF THE EMBODIMENTS

Figure 3A:
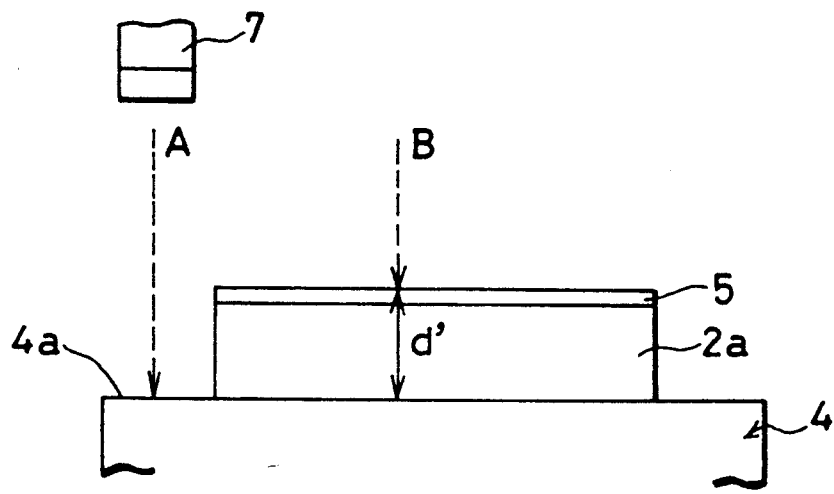
FIG. 3(a) and 3(b) are explanatory view illustrating a method of obtaining a correction factor for correcting the value of the measured thickness of the substrate.

The following description discusses one embodiment of the present invention with reference to FIGS. 1 through 18.

With a method for cutting substrates constituting liquid crystal display elements of this embodiment, the thickness of a substrate is optically measured in a non-contact manner. A dicing device having a substantially disk-shaped dicing blade (hereinafter referred to as just blade) is controlled by the numerical control based on the measurement result when cutting the substrates for exposing the terminal sections and cutting them for dividing them into cells.

In the cutting process for exposing the terminal sections, portions of one of two substrates opposite the terminal sections, which are constituted by ITO (Indium Tin Oxide) electrodes formed on the inner surface of the other substrate, are cut off. Meanwhile, in the cutting process for dividing the substrates into cells, a panel constituted by the pair of substrates, which are placed one over the other with a predetermined gap therebetween, is divided into individual cells as liquid crystal display elements.

As illustrated in FIG. 2, a pair of transparent substrates 2a and 2b with a thickness of, for example, 0.4 mm, made of an acrylic resin, are prepared. A transparent conductive ITO film is deposited on a surface of each substrate and is then etched into a pattern by the photo-etching method to form in parallel a plurality of ITO electrodes 5 in the shape of narrow pieces (see FIG. 6). The ITO electrodes 5 may be formed only on one of the substrates, for example, on the lower substrate 2b.

Next, an alignment film, not shown, is printed on a predetermined location on a surface of each substrate whereupon the ITO electrodes 5 are formed, and molecules of the alignment films are aligned. Then, granular spacers or long cylindrical spacers are placed on the alignment film, and sealing material made of an epoxy resin of UV hardening type or thermohardening type are formed around the alignment film on the substrate by printing using a screen.

A panel 10 is formed by positioning the substrates 2a and 2b one over the other to sandwich the spacers, sealing material and the ITO electrodes 5 and by applying pressure to the substrates 2a and 2b while heating or projecting ultra violet light thereto to harden the sealing material. The spacers between the substrates 2a and 2b provide a gap for a liquid crystal layer, and the sealing material hardened forms a sealing layer 3 between the substrates 2a and 2b.

In the meantime, with the conventional technique for manufacturing the substrates 2a and 2b, there is unevenness of about ±70 μm in the thickness of each substrate. Therefore, to make the broken sections have smooth surfaces, it is desirable to measure the thickness of the substrates 2a or 2b before cutting the panel 10 through the above-mentioned processes.

To optically measure the thicknesses of the substrates 2a and 2b in a non-contact manner, for example, a measuring method using a deviation of the position of an objective lens in focusing or a measuring method using a deviation, i.e., a phase difference of reflected light of laser light is adopted.

In the method using a deviation of the position of an objective lens in focusing, light is first focused by an objective lens 7 on a reference plane 4a of a stage 4 (A) as a worktable whereupon the panel 10 is placed. Next, the light is focused on the ITO electrode 5 on the lower substrate 2b (B). A thickness d of the lower substrate 2b at the measuring point (B) is given by a difference between a distance from the reference plane 4a to the objective lens 7 measured at the measuring point (A) and a distance measured from the measuring point (B) to the objective lens 7.

As for the focal point on the panel 10, the light is focused on either a portion (C) of the bottom surface of the upper substrate 2a which does not have the ITO electrodes 5 or the surface (D) of the ITO electrodes 5 formed on the bottom surface of the upper substrate 2a.

In this case, a distance between the bottom surface of the upper substrate 2a and the reference plane 4a is given by a difference between a distance measured from the measuring point (A) to the objective lens 7 and a distance measured from the measuring point (C) to the objective lens 7 or a difference between a distance measured from the measuring point (A) to the objective lens 7 and a distance measured from the measuring point (D) to the objective lens 7.

Since the refractive index of the substrate 2a affects the accuracy of measurement, it is necessary to calculate in advance a correction factor for correcting a measured value. For the calculation, as illustrated in FIG. 3(a), firstly, the substrate 2a before superposed is placed on the reference plane 4a with a side having the ITO electrodes 5 up. Then, by focusing light on the reference plane 4a (A) and on the top surface of the upper substrate 2a (B) respectively, the thickness d, of the substrate 2a is measured by a difference between a distance measured from the measuring point (A) to the objective leans 7 and a distance measured from the measuring point (B) to the objective lens 7.

Then, using a contact-type substrate thickness measuring method, the thickness d' of the substrate 2a is measured at the same measuring point (B). By comparing the result of this measurement and the result of the non-contact-type measurement, the accuracy of measurement using a deviation of the position of an objective lens is evaluated.

Figure 3B:
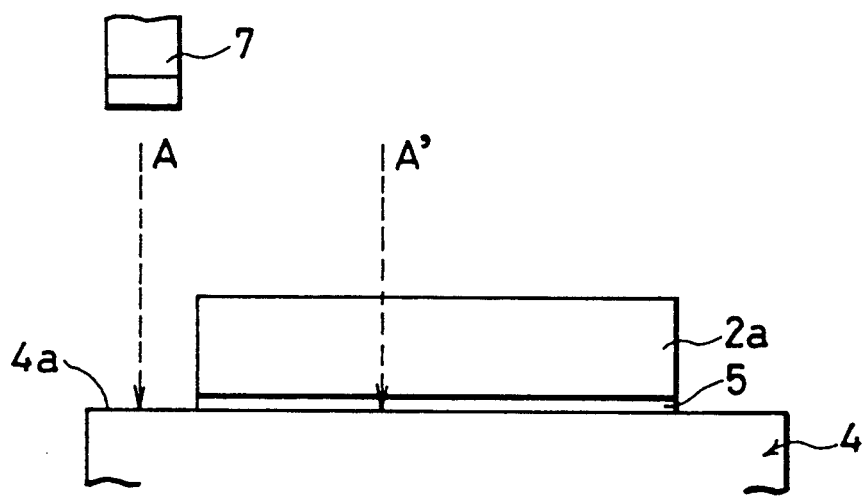

Next, the substrate 2a is placed upside down on the reference plane 4a so that the ITO electrodes 5 become the bottom as illustrated in FIG. 3(b). Then, light is focused directly on the reference plane 4a (A) and is also focused on the stage 4 through the substrate 2a (A'). A correction factor for correcting a measured value with respect to the thickness of the substrate 2a is calculated by a difference between a distance measured from the measuring point (A) to the objective lens 7 and a distance measured from the measuring point (A') to the objective lens 7.

Figure 4:
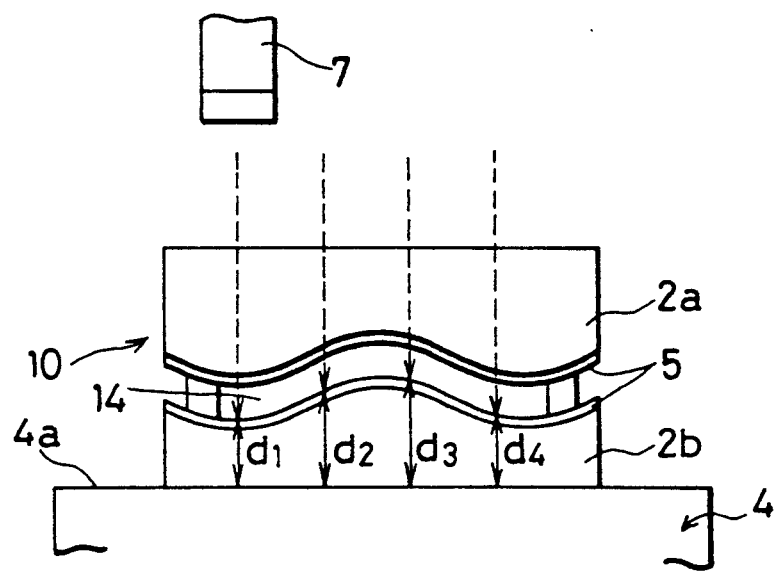
FIG. 4 is an explanatory view where the thickness of the substrate is measured at a plurality of points along the dividing line on the substrate.

As described above, by using a deviation of the position of the objective lens 7 in focusing, the thickness of the lower substrate 2b is measured at plurality points, $d_1$, $d_2$ $d_3$ and $d_4$ as shown in FIG. 4 along a dividing line, not shown. Then, the respective measured values are corrected by the correction factor so as to measure unevenness of the thickness of the substrate 2b and a deformation of the shape such as waviness. Unevenness of the thickness and a deformation of the shape such as waviness of the substrate 2a are measured in the same manner.

Figure 5:
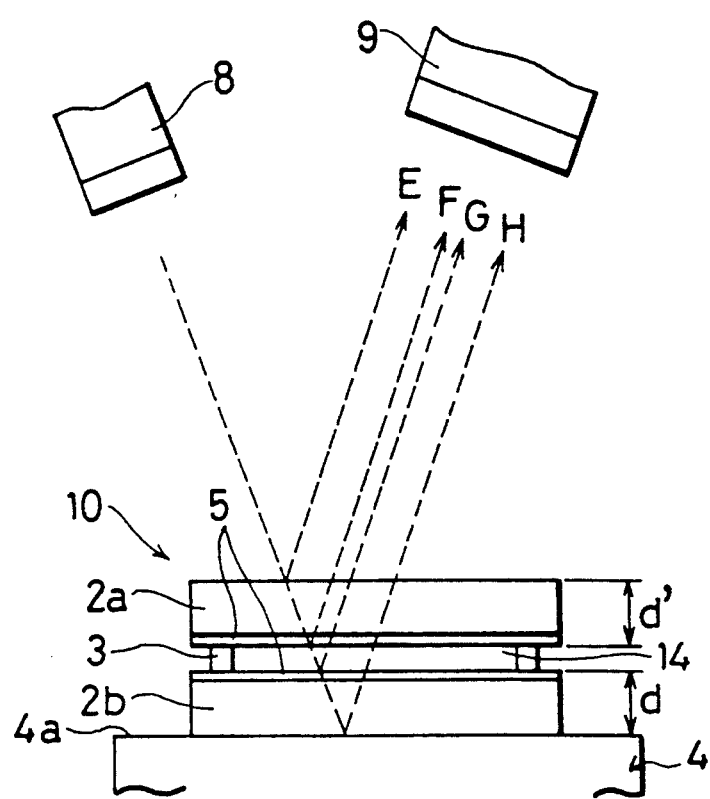
FIG. 5 is an explanatory view illustrating an alternative method of measuring the thickness of each of the substrates.

With respect to the method using a deviation, i.e., a phase difference, of reflected light, as illustrated in FIG. 5, the thicknesses of the substrates 2a and 2b are respectively measured at the points along the dividing line with the use of a laser board thickness measuring device (of Anritsu Corporation, for example). The laser board thickness measuring device has a light emitting section 8 for emitting laser light to the substrates 2a and 2b and a light receiving section 9 upon which reflected light from the substrates 2a and 2b falls.

Laser light emitted from the light emitting section 8 is reflected by the layers of the substrates 2a and 2b, respectively. Reflected light (E) through reflected light (H) fall upon the light receiving section 9. The thickness d' of the upper substrate 2a or the thickness d of the lower substrate 2b is measured by detecting a difference between, for example, the reflected light (E) from the top surface of the substrate 2a and the reflected light (F) from the bottom surface thereof or a difference between the reflected light (G) from the top surface of the lower substrate 2b and the reflected light (H) from the bottom surface thereof at the light receiving section 9.

With this method, it is also necessary to evaluate the accuracy of measuring the thicknesses of the substrates 2a and 2b by comparing the result of the above-mentioned measurement and that of measurement conducted by the contact-type measuring method. Moreover, it is also necessary to calculate a correction factor for correcting a measured value with respect to the thickness of the substrates 2a and 2b.

With the method using a deviation of reflected light of laser light, it is possible to conduct measurement substantially 1000 times per second in a continuous manner. Thus, the time taken for measuring the thicknesses of the substrates 2a and 2b are shortened.

Figure 6:
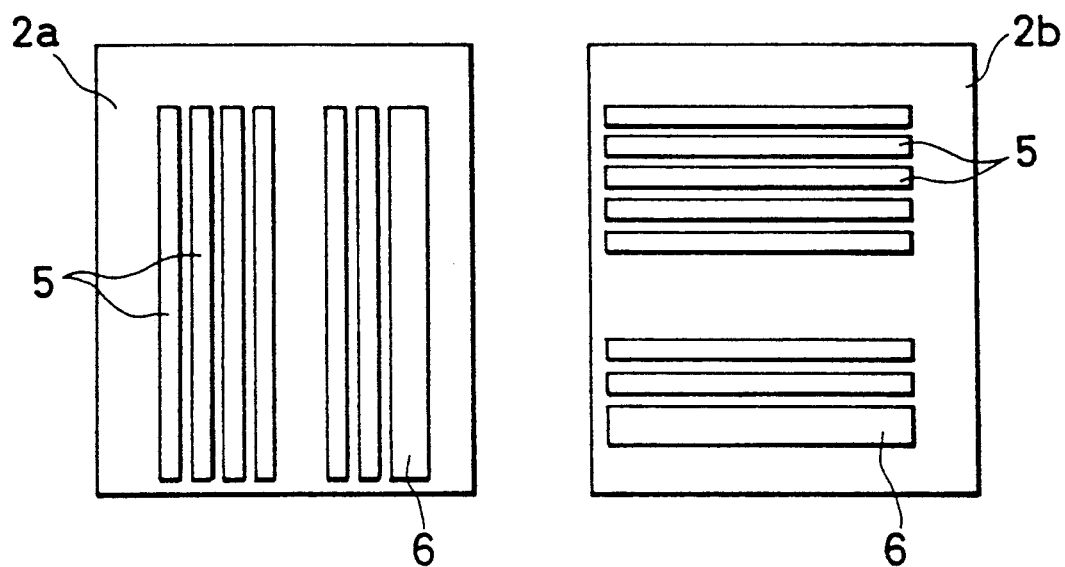
FIG. 6 is a plan view illustrating the respective substrates whereupon ITO electrodes and dummy patterns are formed.

The accuracy of measuring the thicknesses of the substrates 2a and 2b is improved by forming a dummy pattern 6 with an ITO layer respectively on portions of the upper and lower substrates 2a and 2b where the sealing layer 3 is to be formed when forming the ITO electrodes 5 on the substrates 2a and 2b as shown in FIG. 6.

More specifically, as illustrated in FIG. 1, the laser light emitted from the light emitting section 8 is projected along the dummy pattern 6 in the vicinity of the dividing line (shown with the alternate long and short dash line in the drawing) of the panel 10. Then, the thickness d' of the upper substrate 2a is measured by detecting at the light receiving section 9 a difference between reflected light (I) from the top surface of the upper substrate 2a and reflected light (J) from the bottom surface of the upper substrate 2a.

Thus, when the dummy pattern 6 made of the ITO layer is formed on the bottom surface of the upper substrate 2a, the refractive index varies at the substrate 2a and the dummy pattern 6. Consequently, a higher reflectance is derived from the boundary, i.e., the bottom surface of the upper substrate 2a.

Since there exists under the dummy pattern 6 the sealing layer 3 whose light transmittance is not considered, the laser light can hardly pass through the sealing layer 3. Even if the laser light passes through the sealing layer 3 and is reflected by the top surface of the lower substrate 2b, the reflected light is scattered in the sealing layer 3. As a result, the light receiving section 9 receives a reduced amount of the reflected light from the lower substrate 2b, preventing interference between the reflected light from the upper substrate 2a and that from the lower substrate 2b.

As described above, the formation of the dummy pattern 6 enables more accurate measurement of the thickness of the substrate 2a.

Figure 7:
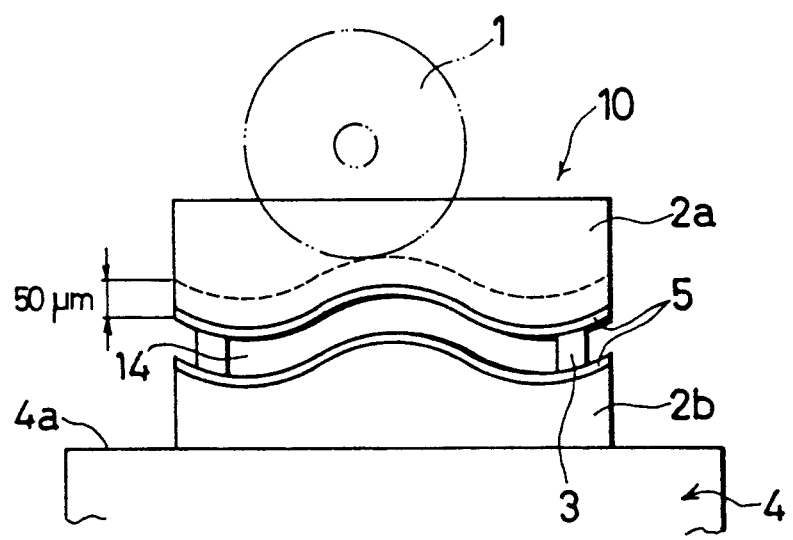
FIG. 7 is an explanatory view illustrating a process of cutting the substrate with a blade.

Next, with reference to FIG. 7, the following description discusses a process of cutting the panel 10 with a dicing device (for example, manufactured by Okamoto Kosakukikai Seisakusho) The dicing device has a disk-shaped blade 1 with diamond abrasive. The substrate 2a is cut, for example, along predetermined dividing lines thereon by grinding by means of the blade 1 rotating at a high speed while moving the stage 4.

When cutting the substrate 2a, if the blade 1 is rotated at a high speed, the surfaces of the cut sections do not crack. The substrate 2a is thus cut with precision. The surfaces of the cut sections can be smoother by changing conditions, for example, the rotation speed, the thickness and diameter of the blade 1, the grain size of diamond abrasive, and the feed speed of the stage 4 on which the panel 10 to be cut is fixed by suction.

The blade 1 used in this embodiment has a thickness of 35 m, a diameter of 50.2 mm and is rotated at 20000 rpm. The feed speed of the stage 4 is 30 mm/sec. According to the measured thickness of the substrate 2a, data is input into the dicing device so that it cuts the substrate 2a while leaving, for example, 50 $\mu$m thereof uncut.

When the thickness d of the substrate 2b is measured, the dicing device is controlled so that the distance from the stage 4 to the edge of the blade 1 is equal to the sum of the thickness d of the lower substrate 2b, a uniform thickness of a gap 14 and a thickness of a portion of the substrate to be uncut. Then, the substrate 2a is cut with the blade 1 along the dividing line. In the case of using a substrate of a thickness of 0.4 mm, produced from an acrylic resin or a copolymer of the acrylic resin and other resin, 50 $\mu$m is an appropriate amount for the thickness of the uncut portion.

On the other hand, when the thickness d' of the substrate 2a is measured, the dicing device is controlled such that the depth of slit made by the blade 1 is equal to a value which is obtained by subtracting an appropriate amount for the thickness of the uncut portion, for example, 50 $\mu$m from the thickness d' of the substrate 2a.

Figure 8:
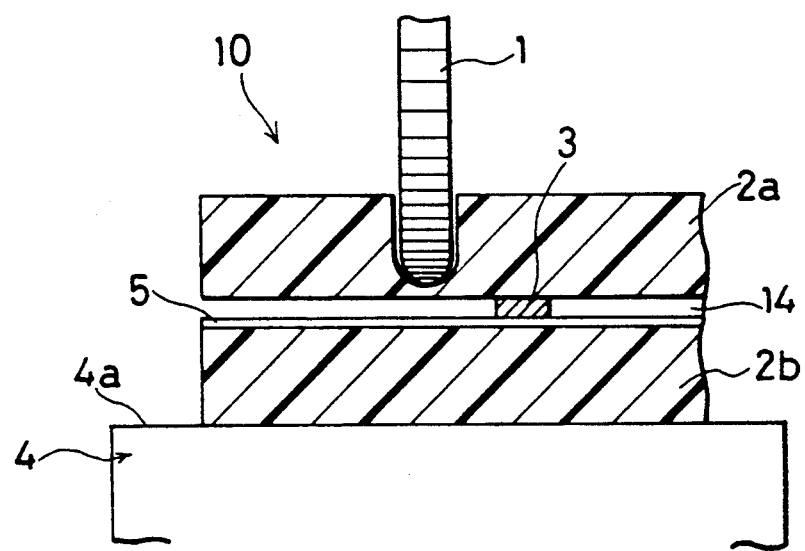
FIG. 8 is an explanatory view illustrating a cutting process of exposing the terminal sections of the substrate.
Figure 13:
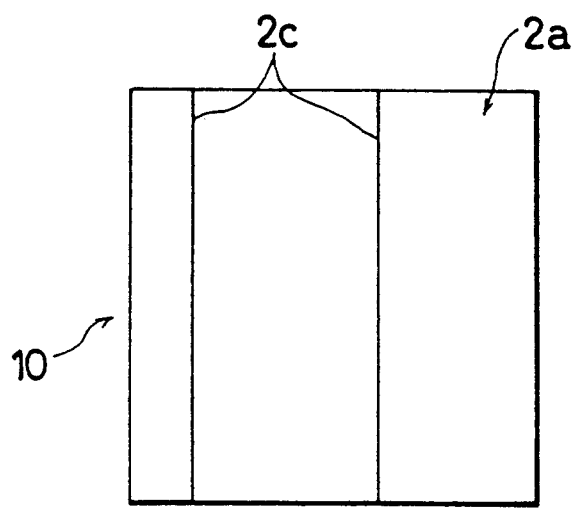
FIG. 13 is an explanatory view illustrating a panel which was cut along predetermined dividing lines in the cutting process of exposing the terminal sections.
Figure 14:
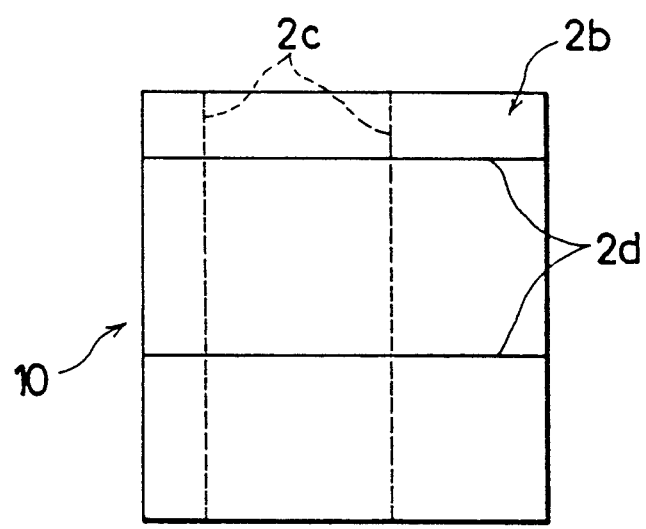
FIG. 14 is an explanatory view illustrating the panel which was placed upside down, turned by 90° and cut along predetermined dividing lines.

Consequently, even if the shape of the substrate 2b varies, the blade 1 of the dicing device to which the data on the thickness of the substrate 2a or 2b is input is controlled to always cut the substrate 2a along the dividing lines while leaving 50 $\mu$m of the substrate 2a uncut as illustrated in FIGS. 7, 8 and 13.

Figure 9:
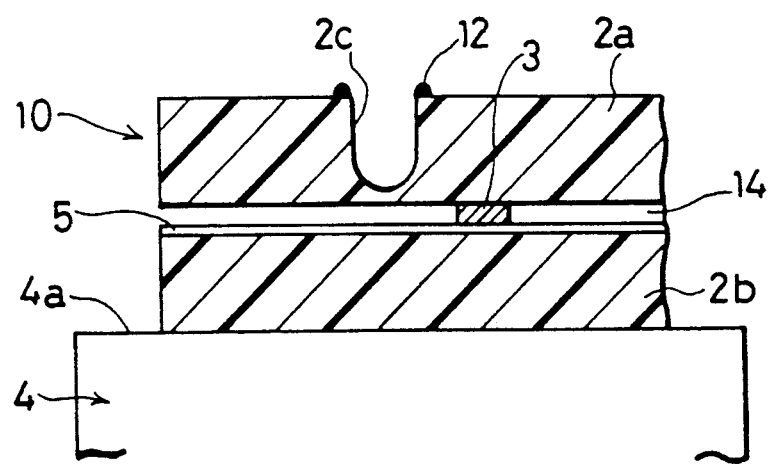
FIG. 9 is an explanatory view illustrating burrs produced on the substrate.

During cutting, a frictional heat is produced by the rotating blade 1 and the upper substrate 2a. The frictional heat melts the surfaces of the cut sections and chips of the substrate 2a made by blade 1 in cutting. As a result, as illustrated in FIG. 9, a burr 12 protruding about 50 $\mu$m to 100 $\mu$m from the surface of the substrate 2a is formed on each side of the openings of slits 2c along the dividing lines.

When cutting the substrate 2b by placing the panel 10 upside down, the burrs 12 come into contact with the reference plane 4a of the stage 4, deteriorating the accuracy of measuring the thicknesses of the substrates 2a and 2b. These burrs 12 also cause a problem when installing an individual cell in its case.

Figure 10:
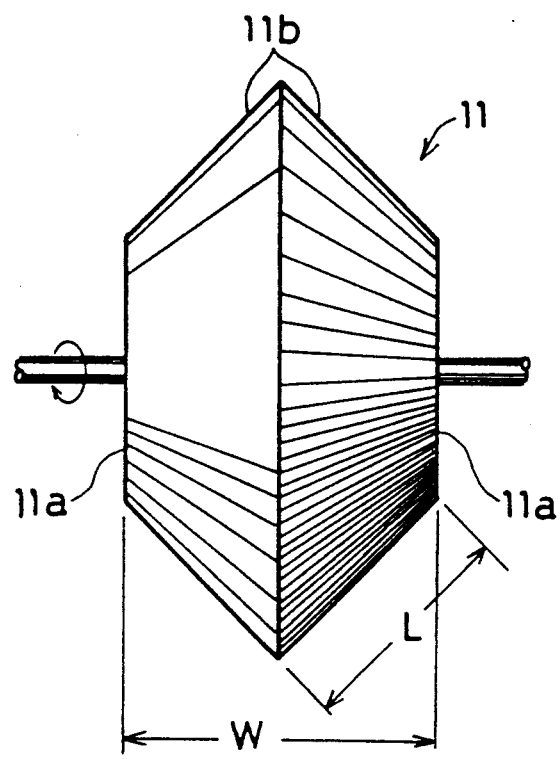
FIG. 10(a) is a side view and FIG. 10(b) is a front view respectively illustrating the shape of a rotating abrasive wheel for removing burrs.
Figure 10B:
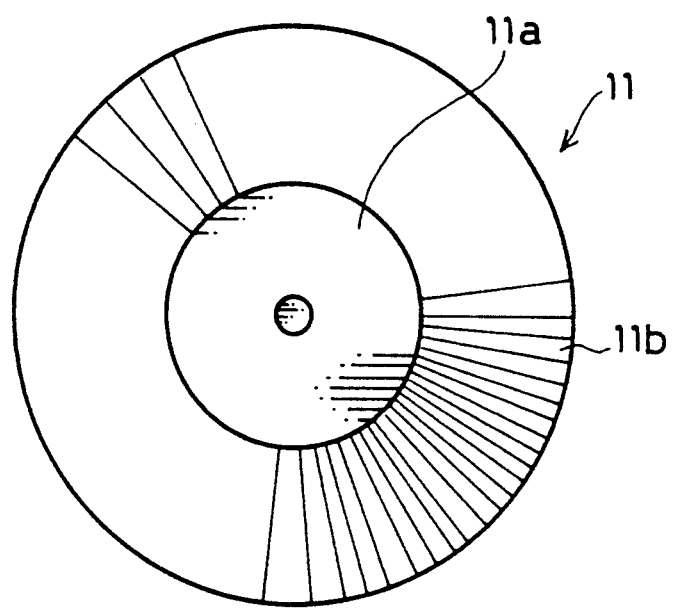

To overcome such problems, in the dicing device, a substantially disk-shaped rotating abrasive wheel 11 as burr removing means is mounted to follow the movement of the blade 1. As illustrated in FIGS. 10(a) and 10(b), the blade 1 and the rotating abrasive wheel 11 are attached to a scanning arm (not shown).

The rotating abrasive wheel 11 is formed by a pair of truncated cones whose larger edges are connected one another so as to have the same center. The rotating abrasive wheel 11 has a circular flat surface 11a on both sides on its rotating axis. The distance (W) between the flat surfaces 11a is between 50 $\mu$m and 100 $\mu$m that is greater than the thickness of the blade 1.

The rotating abrasive wheel 11 has two grinding faces 11b with a length (L) of 250 $\mu$m to 500 $\mu$m. The grinding faces 11b have graininess surfaces whose abrasive grain size is equivalent to #800 set forth in category R6001 of JIS (Japanese Industrial Standard). The grinding faces 11b slope toward the rotating axis so that they form a sharp edge.

Figure 11:
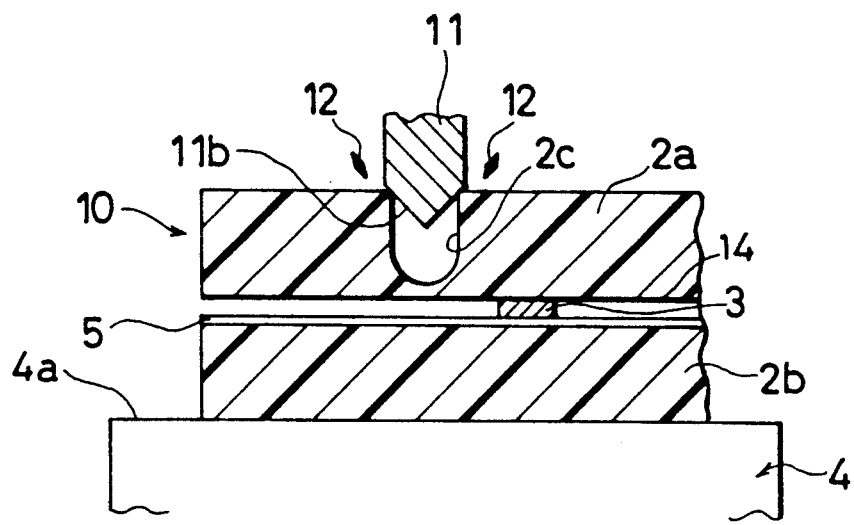
FIG. 11 is an explanatory view illustrating a process of removing the burrs with the rotating abrasive wheel.

As illustrated in FIG. 11, the edge of the grinding faces 11b is inserted into the slit 2c to a depth of about 150 $\mu$m to 200 $\mu$m while rotating the rotating abrasive wheel 11 at 500 rpm. When cutting the substrate 2 with the blade 1, by making the rotating grinding faces 11b contact with both the burrs 12, the burrs 12 are removed.

In the case where the ITO electrodes 5 are also formed on the substrate 2a, the panel 10 is placed upside down, i.e., the substrate 2b comes above the substrate 2a and then turned by 90° on the stage 4. Next, similar to the cutting of the substrate 2a, after measuring the thickness of the lower substrate 2b along predetermined dividing lines, the dicing device is controlled such that the blade 1 cuts the lower substrate 2b while leaving 50 $\mu$m thereof uncut. As a result, slits 2d are formed along the dividing lines (see the broken lines of FIG. 14). Then, the burrs 12 produced along the slits 2d are removed by the rotating abrasive wheel 11 in the same manner as described above.

Figure 12:
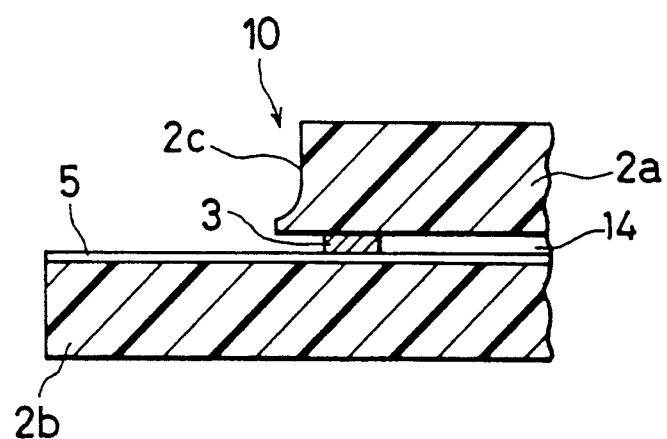
FIG. 12 is an explanatory view illustrating the completion of the cutting process of exposing the terminal sections.

A portion of the substrate 2a or the substrate 2b is broken off (breaking process) along the slits 2c made by cutting as shown in FIG. 12. Consequently, the terminal sections of the ITO electrodes 5 are exposed.

Figure 15:
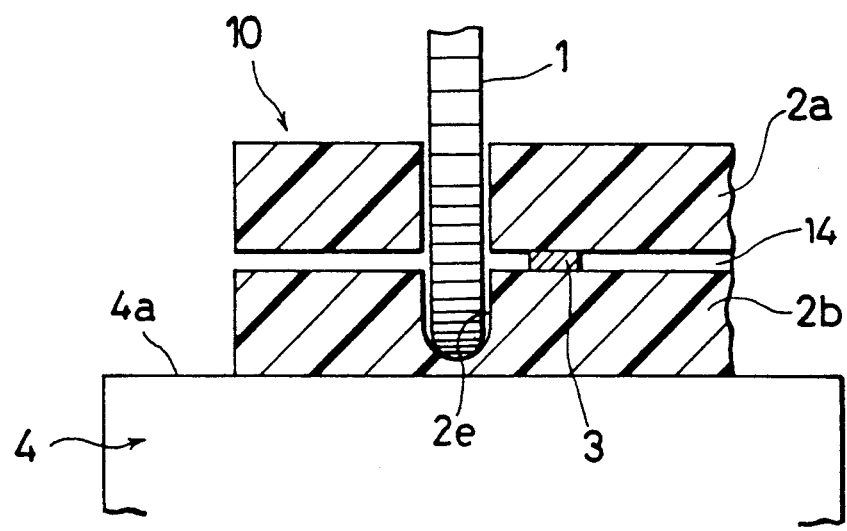
FIG. 15 is an explanatory view illustrating a process of cutting the panel into cells.

When dividing the panel 10 into cells, as illustrated in FIG. 15, the upper substrate 2a is first cut along the dividing line with the blade 1. After completely cutting the upper substrate 2a, the lower substrate 2b is cut to make slits 2e. At this time, it is arranged that the blade 1 cuts the panel 10 to a point 40 $\mu$m above the bottom of the lower substrate 2b. Consequently, 40 $\mu$m of the lower substrate 2b remains uncut.

Since the dicing device has the rotating abrasive wheel 11, burrs produced in the vicinity of the slits 2e are removed substantially when cutting the panel 10 with the blade 1. Next, after turning the panel 10 by 90°, the upper and lower substrates 2a and 2b are cut in the manner as described above along the dividing lines shown by the alternate long and short dash lines of FIG. 17.

Figure 16:
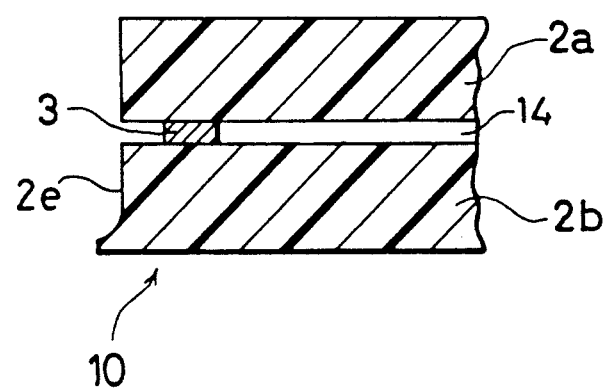
FIG. 16 is an explanatory view illustrating the completion of the process of cutting the panel into cells.
Figure 17:
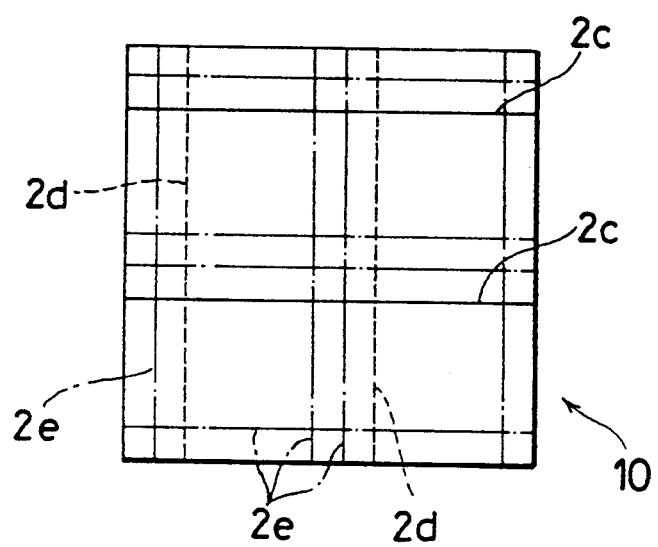
FIG. 17 is an explanatory view illustrating the panel which was cut along the predetermined dividing lines in the process of cutting the panel into cells.
Figure 18:
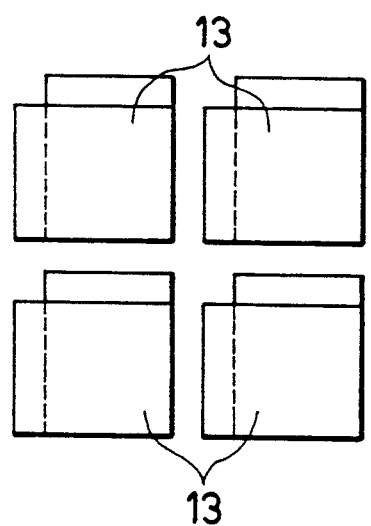
FIG. 18 is an explanatory view illustrating individual cells produced by the process of cutting the panel into cells.

The panel 10 is then broken along the slits 2e on the lower substrate 2b as illustrated in FIG. 16. As a result, cells 13 as liquid crystal display elements are produced as shown in FIG. 18. Next, portions of the substrate is broken off along the slits 2c and 2e to expose the terminal sections of the ITO electrodes 5 shown in FIG. 12. Subsequently, each cell 13 is filled with a liquid crystal (not shown) and the manufacturing of the liquid crystal display elements is completed.

Since the upper substrate 2a and the lower substrate 2b are cut by grinding by means of the blade 1 rotating at a high speed, the surfaces of the cut sections do not crack. Additionally, for example, since the lower substrate 2b is not completely cut when cutting the panel 10 for dividing it into cells, the reference plane 4a of the stage 4 of the dicing device is not damaged by the blade 1. It is therefore possible to use the stage 4 many times.

As described above, in the cutting method of this embodiment, the thickness of the substrate 2a is optically measured in a non-contact manner based on a deviation of the position of the objective lens in focusing or a deviation of the reflected light of laser light. With this method, since the dicing device is controlled based on the results of measurement, even when the substrate 2a does not have a uniform thickness or is wavy, it is possible to control a portion of an appropriate amount to be uncut when cutting the substrate 2a.

The appropriate amount must meet the following conditions: the ITO electrodes 5 on the substrate 2b should not be damaged when the edge of the blade 1 passes through one of the substrates, for example, the substrate 2a; and the thickness of a portion of the substrate 2a to be uncut should be as small as possible.

In the succeeding breaking process, by breaking the panel 10 along the slits, the surfaces of the broken sections do not crack, enabling the cut sections to have smoother surfaces.

Besides, it is possible to use the above-mentioned method for substrates produced from material other than an acrylic resin, for example, glass, an epoxy resin and a copolymer of acrylic resin and other resin if these substrates have a uniform light transmittance and a stable refractive index.

By making slits on the upper and lower substrates 2a and 2b while leaving portions with a predetermined thickness uncut, the breaking process is conducted easily in comparison to that for a conventional glass substrate.

On the other hand, with the method of manufacturing liquid crystal elements by cutting the upper and lower substrates into cells and then superposing the substrates, it is necessary to adjust the gap between the upper and lower substrates of each cell one by one. Additionally, when a plurality of upper and lower substrates are pressed for sealing, the surfaces of the upper substrates tend not to be level. As a result, the uniformity of the gap between two substrates among the cells deteriorates. Furthermore, since the ITO electrodes on the upper and lower substrates are not covered, there is a possibility that the ITO electrodes come into contact with, for example, the substrate and are cut when being pressed.

In contrast, with the method of this embodiment, since the upper and lower substrates 2a and 2b are united before being cut, the difference in level among the upper substrates 2a becomes smaller compared with that in the conventional method. This method enables the cells to have a uniform gap between the two substrates 2a and 2b and prevents the ITO electrodes 5 on the substrates 2a and 2b to be cut.

Furthermore, when the dummy pattern 6 made of the ITO layer is formed beforehand on a position where the sealing layer 3 is to be formed, located in the vicinity of a dividing line on the upper substrate 2a and/or the lower substrate 2b, the refractive index varies at the dummy pattern 6 and at the upper and lower substrates 2a and 2b, improving the reflectance at the boundary.

Meanwhile, since the light transmittance of the sealing layer 3 is not considered, light can hardly pass through the sealing layer 3 and reach the layers below the sealing layer 3. In addition, since reflected light from a portion of the top surface of the lower substrate 2b, which is in contact with the sealing layer 3, is scattered in the sealing layer 3, the reflected light can hardly reach the light receiving section 9.

Thus, by projecting laser light onto the dummy pattern 6 with the use of the laser board thickness measuring device, for example, the intensity of reflected light from the bottom surface of the upper substrate 2a increases. This arrangement makes it possible to prevent interference between the reflected light from the lower substrate 2b and the reflected light from the upper substrate 2a, enabling more accurate measurement of the thickness of the upper substrate 2a.

Furthermore, since the rotating abrasive wheel 11 is provided, by making the rotating abrasive wheel 11 to follow the movement of the blade 1, the burrs 12 produced on the surfaces of the cut sections of the panel 10, for example, on the upper substrate 2a are removed immediately after the blade 1 cuts the substrate 2a.

Hence, when cutting the lower substrate 2b with the blade 1 after placing the panel 10 upside down, it is possible to swiftly remove the burrs 12 which adversely affects the depth of slit on the lower substrate 2b and the precision of dimensions and the smoothness of the surfaces of cells 13 without introducing an additional process for removing the burrs 12.

With this embodiment, the thicknesses of the upper substrate 2a and the lower substrate 2b and distances between the reference plane 4a and these substrates are optically measured. However, these methods are merely examples, and therefore other non-contact measuring method, for example, a method using a supersonic wave is adopted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for dividing substrates constituting liquid crystal display elements compromising the steps of:
   (a) placing a pair of transparent substrates one over the other so as to form therebetween a gap into which a liquid crystal is to be sealed in;
   (b) mounting said substrates on a reference plane of a state so as to make a surface of said substrates come into contact with said reference plane;
   (c) measuring a distance between said reference plane and one substrate as a first substrate in a non-contact manner at a plurality of measuring points on a dividing line along which said first substrate is cut;
   (d) making a slit on said first substrate by cutting said first substrate along said dividing line, said first substrate being cut based on the measured distances which vary due to the lack of uniform thickness informing said substrates so as to keep a portion of said first substrate with a substantially uniform predetermined thickness uncut; and
   (e) diving said first substrate by breaking it along said dividing line.

2. The method for dividing substrates constituting liquid crystal display elements according to claim 1, wherein said substrates are made of a synthetic resin.

3. The method for dividing substrates constituting liquid crystal display elements according to claim 1, wherein said substrates are made of an acrylic resin.

4. The method for dividing substrates constituting liquid crystal display elements according to claim 1, wherein said substrates are made of an epoxy resin.

5. The method for dividing substrates constituting liquid crystal display elements according to claim 1, wherein said first substrate is cut with a rotating dicing blade.

6. The method for dividing substrates constituting liquid crystal display elements according to claim 5, wherein said first substrate is cut along the dividing line by changing a position of the first substrate with respect to the dicing blade while changing a position of said dicing blade with respect to said reference plane based on the distances measured, the position of said first substrate with respect to said dicing blade being changed by moving the stage.

7. The method for dividing substrates constituting liquid crystal display elements according to claim 1, wherein the distance between said first substrate and said reference plane is measured optically by using an objective lens whose position is adjustable with respect to said reference plane and detecting a difference in the position of said objective lens when it is focused on said reference plane and that of said objective lens when it is focused on a surface of said first substrate facing said reference plane.

8. The method for dividing substrates constituting liquid crystal display elements according to claim 1, wherein the distance between said first substrate and said reference plane is measured optically by using laser light projected toward said reference plane through said substrates and detecting a phase difference between reflected light from said reference plane and reflected light from a surface of said first substrate facing said reference plane.

9. A method for dividing substrates constituting liquid crystal display elements comprising the steps of:
   (a) placing first transparent substrate and a second transparent substrate one over the other so as to form therebetween a predetermined gap into which a liquid crystal is to be sealed in, said first substrate having a transparent electrodes on its surface for causing the liquid crystal to have an electric field;
   (b) mounting said substrates on a reference plane of a stage so as to make said first substrate comes into contact with said reference plane;

(c) measuring a distance between said reference plane and said second substrate in a non-contact manner at a plurality of measuring points on a dividing line;

(d) making a slit on said second substrate by cutting said second substrate along said dividing line, said second substrate being cut based on the measured distances which can vary due to the lack of uniform thickness in forming said substrate so as to keep a portion of said second substrate with a substantially uniform predetermined thickness uncut; and (e) breaking a portion of said second substrate off along said dividing line so as to expose said transparent electrodes on said first substrate.

10. The method for dividing substrates constituting liquid crystal display elements according to claim 9, wherein said substrates are made of an acrylic resin.

11. The method for dividing substrates constituting liquid crystal display elements according to claim 9, wherein said second substrate is cut with a rotating dicing blade.

12. The method for dividing substrates constituting liquid crystal display elements according to claim 9, wherein said second substrate is cut while changing a position of said dicing blade with respect to said reference plane based on the distances measured.

13. The method for dividing substrates constituting liquid crystal display elements according to claim 9, wherein the distance between said second substrate and said reference plane is measured optically by using an objective lens whose position is adjustable with respect to said reference plane and detecting a difference in the position of said objective lens when it is focused on said reference plane and that of said objective lens when it is focused on a surface of said second substrate facing said reference plane.

14. The method for dividing substrates constituting liquid crystal display elements according to claim 9, wherein the distance between said second substrate and said reference plane is measured optically by using laser light projected toward said reference plane through said substrates and detecting a phase difference between reflected light from said reference plane and reflected light from a surface of said second substrate facing said reference plane.

15. A method for dividing substrates constituting liquid crystal display elements comprising the steps of:

(a) placing a first transparent substrate and a second transparent substrate one over the other so as to form therebetween a predetermined gap into which a liquid crystal is to be sealed in, said first substrate having on its inner surface a transparent layer formed along a predetermined dividing line;

(b) mounting said substrates on a reference plane of a stage so as to locate said transparent layer between said first substrate and said reference plane;

(c) measuring a distance between said reference plane and said first substrate at a plurality of measuring points on said dividing line by projecting laser light onto said reference plane through said first layer and said transparent layer and detecting a phase difference between reflected light from said reference plane and reflected light from a phase boundary between said first substrate and said transparent layer;

(d) making a slit on said first substrate by cutting said first substrate toward said reference plane based on the measured distances which vary due to the lack of uniform thickness in forming said substrates so as to keep a portion of said first substrate with a substantially uniform predetermined thickness uncut; and (e) breaking said first substrate along the slit.

16. The method for dividing substrates constituting liquid crystal display elements according to claim 15, wherein said substrates are made of a synthetic resin.

17. The method for dividing substrates constituting liquid crystal display elements according to claim 15, wherein said substrates are made of an acrylic resin.

18. The method for dividing substrates constituting liquid crystal display elements according to claim 15, wherein said substrates are made of an epoxy resin.

19. The method for dividing substrates constituting liquid crystal display elements according to claim 15, wherein said first substrate is cut with a rotating dicing blade.

20. The method for dividing substrates constituting liquid crystal display elements according to claim 19, wherein said first substrate is cut while changing a position of said dicing blade with respect to said reference plane by moving said stage.

21. The method for dividing substrates constituting liquid crystal display elements according to claim 15, wherein said transparent layer is a transparent electrode.

22. The method for dividing substrates constituting liquid crystal display elements according to claim 15, wherein a sealing layer is formed between said first and second substrates along said dividing line.

23. A method for dividing substrates constituting liquid crystal display elements comprising the steps of:

(a) placing a first transparent substrate and a second transparent substrate one over the other so as to form therebetween a gap into which a liquid crystal is to be sealed in;

(b) mounting said first and second substrates on a reference plane of a stage so as to make said first substrate come into contact with said reference plane;

(c) measuring a distance between said reference plane and said second substrate in a non-contact manner at a plurality of measuring points on a dividing line for cutting said second substrate;

(d) making a slit on said second substrate with cutting means by cutting said second substrate toward said reference plane based on the measured distances which vary due to the lack of uniform thickness in forming said substrates so as to keep a portion of said second substrate with a substantially uniform predetermined thickness uncut;

(e) removing a burr produced on each side of an opening of said slit with burr removing means, said burr removing means follows a movement of the cutting means;

(f) breaking said second substrate along said slit;

(g) removing said first and second substrates from said stage;

(h) mounting said first and second substrates on said reference plane of said stage so as to make said second substrate come into contact with said reference plane;

(i) measuring a distance between said reference plane and said first substrate in a non-contact manner at a plurality of measuring points on a dividing line for cutting said first substrate;

(j) making a slit on said first substrate by cutting said first substrate toward said reference plane based on the measured distances which vary due to the lack of uniform thickness in forming said substrate so as to keep a portion of said first substrate with a substantially uniform predetermined thickness uncut; and (k) breaking said first substrate along said slit.

24. The method for dividing substrates constituting liquid crystal display elements according to claim 23, wherein said burr removing means is a rotating abrasive wheel.

25. The method for dividing substrates constituting liquid crystal display elements according to claim 23, wherein a thickness of said rotating abrasive wheel along its rotating axis becomes smaller from the center toward the edge in a radial direction.

26. The method for dividing substrates constituting liquid crystal display elements according to claim 23, wherein a transparent electrode is formed on each of said substrates and said substrates are placed one over the other so as to sandwich said transparent electrodes.

27. The method for dividing substrates constituting liquid crystal display elements according to claim 23, wherein said cutting means is a dicing blade.

* * * * *

UNITED STATES PATENT AND TRADEMARK OFFICE
CERTIFICATE OF CORRECTION

PATENT NO. : 5,278,685

DATED : January 11, 1994

INVENTOR(S) : Iwamoto, et al.

It is certified that error appears in the above-identified patent and that said Letters Patent is hereby corrected as shown below:

Column 11, claim 1, line 67 change "state" to "stage".

Signed and Sealed this

Twelfth Day of July, 1994

Attest:

BRUCE LEHMAN

Attesting Officer

Commissioner of Patents and Trademarks